United States Patent [19]

Berson et al.

[11] Patent Number: 5,502,304
[45] Date of Patent: Mar. 26, 1996

[54] BAR CODE SCANNER FOR READING A VISIBLE INK AND A LUMINESCENT INVISIBLE INK

[75] Inventors: William Berson, Weston; Judith D. Auslander, Westport, both of Conn.

[73] Assignee: Pitney Bowes Inc., Stamford, Conn.

[21] Appl. No.: 347,631

[22] Filed: Dec. 1, 1994

[51] Int. Cl.$^6$ ................ G06K 7/12; G06K 7/14
[52] U.S. Cl. .............. 250/271; 235/468; 235/491
[58] Field of Search .............. 250/271; 235/468, 235/491; 283/92

[56] References Cited

U.S. PATENT DOCUMENTS

| | | | |
|---|---|---|---|
| 3,500,047 | 3/1970 | Berry | 250/271 |
| 4,572,803 | 2/1986 | Yamazoe et al. | |
| 4,983,817 | 1/1991 | Dolash et al. | 250/271 X |
| 5,367,148 | 11/1994 | Storch et al. | 235/375 |
| 5,401,960 | 3/1995 | Fisun et al. | 250/271 |

FOREIGN PATENT DOCUMENTS

| | | |
|---|---|---|
| 0340898 | 11/1989 | European Pat. Off. |
| 1471367 | 1/1967 | France . |
| 2090194 | 4/1985 | United Kingdom . |

OTHER PUBLICATIONS

Abstract of Japan Patent (JP 63–191,870) to Takuma et al., CA:Selects Coatings, Inks, & Related Products, No. 7, 1989, p. 17.

George Kallistratos "Fluorescent Properties of Aromatic Complexes with Rare Earths and Other Elements of the II a–Group" May 24, 1982 Chimka Chronika, New Series II 249–266.

Ingmar Grenthe "Stability Relationships Among the Rare Earth Dipicolinates" Jan. 20, 1961, vol. 83, pp. 360–364.

*Primary Examiner*—Carolyn E. Fields
*Assistant Examiner*—Edward J. Glick
*Attorney, Agent, or Firm*—Ronald Reichman; Melvin J. Scolnick

[57] ABSTRACT

A lower layer bar code is written on an object with a normal ink and an upper layer bar code is written over the lower layer bar code with an ink that is invisible to the naked eye. The apparatus of this invention is a detector that is able to read the upper and lower level bar codes.

7 Claims, 5 Drawing Sheets

BAR CODE SCANNER FOR READING A VISIBLE INK AND A LUMINESCENT INVISIBLE INK

CROSS REFERENCE TO RELATED APPLICATIONS

Reference is made to commonly assigned copending patent application Ser. No. 08/347,740 filed herewith entitled "Bar Code Using Luminescent Invisible Inks" in the names of Judith Auslander and William Berson and Ser. No. 08/347,629 filed herewith entitled "Bar Code Scanner For Reading A Lower Layer Luminescent Invisible Ink That Is Printed Below A Upper Layer Luminescent Invisible Ink" in the names of William Berson and Judith Auslander and Ser. No. 08/348,014 filed herewith entitled "Bar Code Printing And Scanning System Utilizing Invisible Wax Based Fluorescent Inks" in the names of Judith Auslander And William Berson.

1. Field of the Invention

The invention relates generally to the field of electronic circuits and more particularly to bar code scanners for reading a lower layer bar code printed with a visible ink and a upper layer bar code printed with an Invisible Ink.

2. Background of the Invention

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a representation of set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. Thus, the scanners read the difference between the light and dark bars by reading the absences of reflected light This light is converted into an electric current signal and then the signal is decoded.

Conventional bar codes are limited in the amount of information they contain. Even two dimensional bar codes such as PDF-417 and Code- 1 are limited to a few thousand bytes of information. The ability to encode greater information density is limited by the performance of available scanning devices, printing devices and materials.

The prior art has attempted to use colored bar codes to convey additional information. However, color printing is inherently analog and the fastness, reproducibility and selective detectability of colored bar code imprints as well as the impracticality of reproducibly calibrating detection systems, prohibit their use for the digital encoding of additional information.

Bar codes have been affixed to many different types of documents, so that they may be read by a machine, thereby reducing labor costs. Documents that include bar codes have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc. In issuing such documents, it is desirable to have them of a convenient size, while including information necessary for identifying the holder of the document and the rights conferred. Thus, oftentimes, there is not enough room to include the bar code with all of the information one would want to include in the bar code.

Another problem encountered by the prior art when bar codes were affixed to documents is that the bar codes were not to difficult to forge and could be easily copied, hence there was unauthorized use of the documents to which the bar codes were affixed.

SUMMARY OF THE INVENTION

This invention overcomes the disadvantages of the prior art by providing a bar code scanner that reads a bar code that provides more information than conventional bar codes. The bar code scanner also reads a bar code that is more difficult to counterfeit than conventional bar codes. A lower layer bar code is printed on an object and an upper layer bar code is printed over the lower layer bar code. The lower layer bar code is printed with an ink that is visible to the naked eye and the upper layer bar code is printed with a luminescent ink that is invisible to the naked eye. The lower layer bar code is read by a first illumination source emitting a first wavelength of incident radiation, and a first sensor which detects the reflected signal. The upper layer bar code is read by an excitation source emitting a second wavelength and a second sensor which detects the luminescent emission of the upper level bar code. The wavelength of the luminescence and the spectral sensitivity of the second sensor may or may not be identical to the wavelength and spectral response of the first illumination source and the first sensor.

An advantage of this invention is that light of the visible bar code is reflected at one frequency and the radiation from the invisible ink is emitted at another frequency so that the detectors detect light at a different frequency. Hence, noise problems are reduced.

The invisible inks used are based on complexes of rare earth elements with an atomic number higher than 57 such as: Eu, Tb, Sm, Dy, Lu, Ln with various chelating agents providing chromophore ligands that absorb in the ultraviolet and the blue region of the spectra such as: β diketones, dipicolinic acid etc. The luminescent emission in these complexes is due to inner transitions such as: $^5D_0 \rightarrow ^7F_1$ and $^5D_0 \rightarrow ^7F_2$ for Europium. All of the above chelates of rare earth metals show a strong ultraviolet absorption in the ultraviolet region of the spectra. Through an internal conversion and systems interference part of this energy is transferred to the rare earth ion which is excited to the electron level of luminescence. The emission of the rare earth ions occurs at very narrow bands of <10 nm.

DETAILED DESCRIPTION OF THE PREFERRED EMBODIMENT

Figure 1:
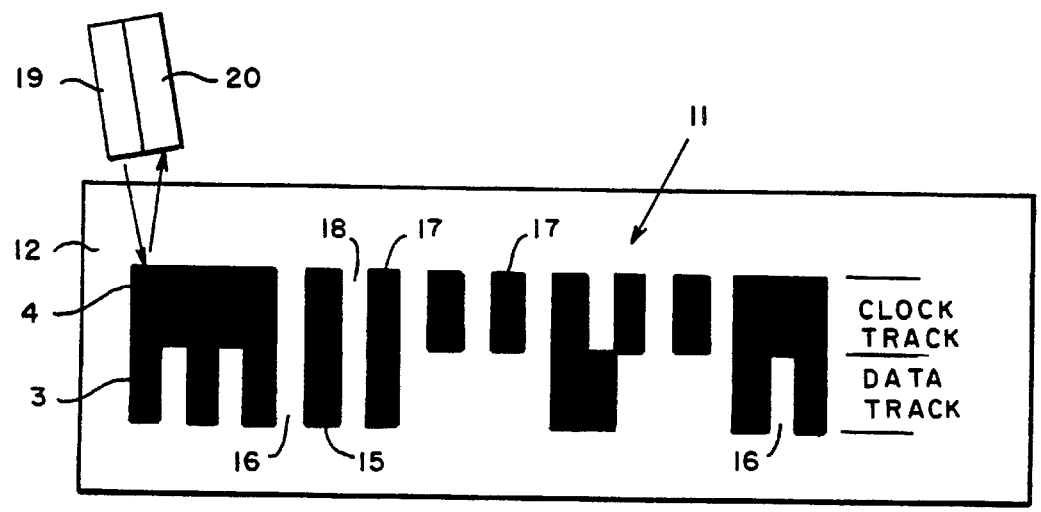
FIG. 1 is a drawing of a bar code that was utilized by the prior art.

In order to better understand that which separates this invention from the prior art consider the following. Refer to the drawings in detail, and more particularly to FIG. 1 a prior art bar code 11 is printed on an object 12. Bar code 11 has a data track 13 and a clock track 14. A black bar 15 would indicate a binary one in the data track and a white space 16 would indicate a zero in the data track. A black bar 17 would indicate a binary one in the clock track and a white space 18 would indicate a binary zero in the clock track.

The information contained in bar code 11 is illuminated by light source 19, reflected by bar code 11 and read by scanner 20.

Thus, FIG. I illustrates the amount of information that may be contained in a prior art black and white bar code.

Figure 2:
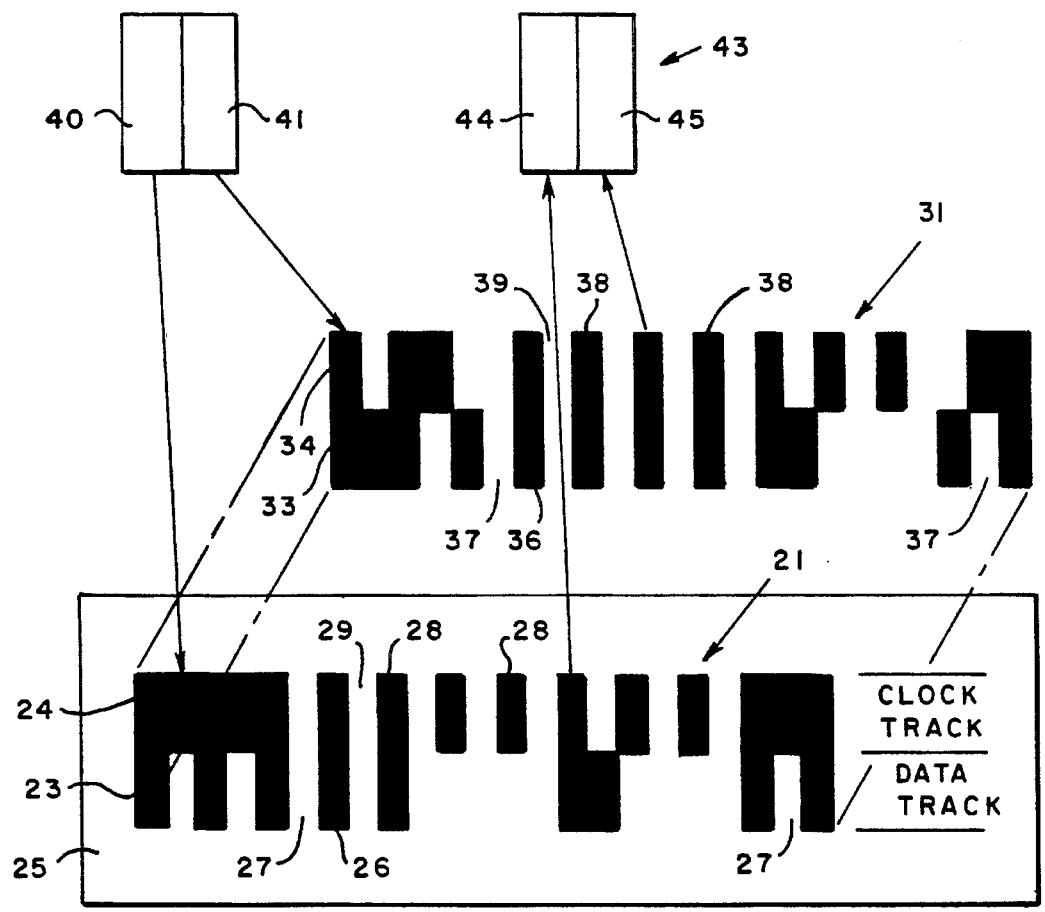
FIG. 2 is a drawing of bar codes that may be read by the apparatus of this invention.

FIG. 2 is a drawing of the bar code of this invention. Lower layer bar code 21 has a data track 23 and a clock track 24. Lower layer bar code 21 is printed on object 25. Object 25 is any surface known in the art in which inks may be printed on i.e.; paper, envelopes, cardboard, plastic, etc. A black bar 26 or space containing ink would indicate a binary one in the data track and a white space 27 or space containing no ink would indicate a zero in the data track. A black bar 28 or space containing ink would indicate a binary one in the clock track and a white space 29 or space containing no ink would indicate a binary zero in the clock track.

An upper layer bar code 31 is printed over lower layer bar code 21. Bar code 31 is printed with an invisible ink. Bar code 31 has a data tract 33 and a clock track 34. A dark bar 36 or space containing ink would indicate a binary one in the data track and an empty space 37 or space containing no ink would indicate a zero in the data track. A dark bar 38 or space containing ink would indicate a binary one in the clock track and an empty space or space containing no ink would indicate a binary zero in the clock track.

Thus, in the same amount of space on object 25, that would be utilized by the prior art to print one bar code, this invention prints two or more bar codes. Hence, more than double the amount of information may be printed in the same space.

The inks that are used to print bar code 31 may be applied using conventional printing methods i.e. ink jet, dot matrix, impact, etc. The inks used to print bar codes 21 and 31 are similar and may have similar reflection wavelengths to the emission wavelength of the ink used to print bar code 31. The ink that is used to print bar code 31 is invisible to the naked eye and can be excited by ultra violet light. Examples of the ink that is used to print bar code 31 is based on organic complexes of, rare earth elements ions (lanthanides), such as: europium, gadolinium and terbium dipicolinates.

Figure 3:
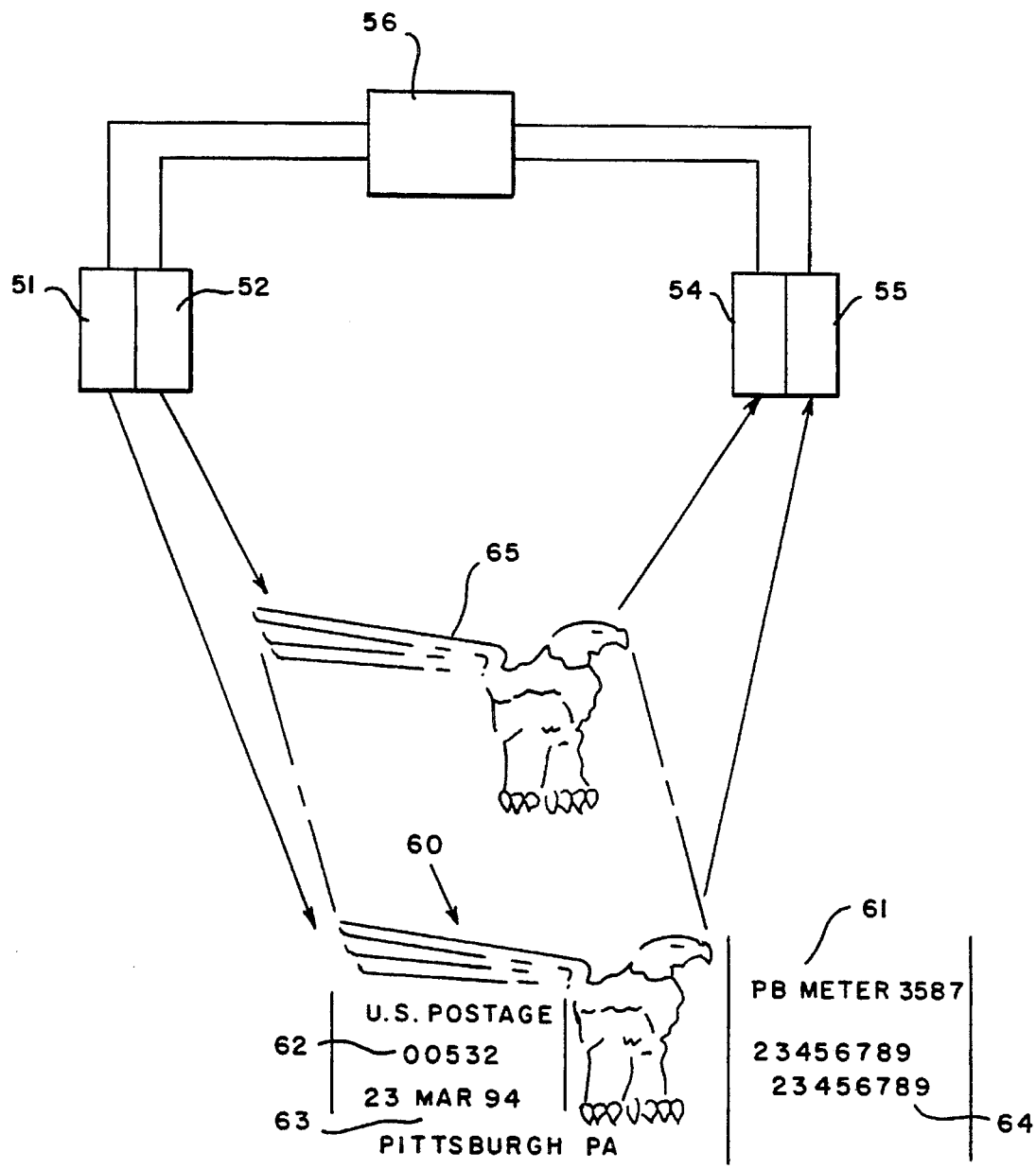
FIG. 3 is a drawing of an alternate embodiment of this invention in which an indicia is printed on an object with a normal ink and an indicia is printed above the object with an invisible ink.

The invisible inks used are based on complexes of rare earth elements with an atomic number higher than 57 such as: Eu, Tb, Sm, Dy with various chelating agents providing chromophore ligands that absorb in the ultraviolet and the blue region of the spectra such as: β diketones, dipicolinic acid etc. The luminescent emission in these complexes is due to inner transitions such as: $^5D_0 \rightarrow ^7F_1$ and $5D^0 \rightarrow ^7F_2$ for Europium. All of the above chelates of rare earth metals show a strong ultraviolet absorption in the ultraviolet region of the spectra. Through an internal conversion and systems interference part of this energy is transferred to the rare earth ion which is excited to the electronic level of luminescence. The emission of the rare earth ions occurs at very narrow bands of <10 nm as seen in FIG. 3. The characteristic wavelength of emission of these rare earth complexes are as follows: $Eu^{3+}$(620 nm), $Tb^{3+}$(547 nm), $Dy^{3+}$(495–500 nm), $Pr^{3+}$(650 nm), $Nd^{3+}$(1.060 nm), $Sm^{3+}$(645nm), $Yb^{3+}$ (971 nm), $Er^{3+}$(1540 nm), $Tm^{3+}$(1800 nm).

The luminescent organic compounds without a rare earth ion have a very broad emission signal as shown in FIG. 1. (>300 nm) and overlap various luminescent bands of inorganic materials such as the rare earth ions. This is due to the broad polyatomic transitions comprising a large segment of the spectra. Therefore, the width of the fluorescence emission and of the broad absorption (see FIG. 2) can not be used for the identification of separate constituents. Therefore, the order to avoid interference between the organic compounds the preferred compounds used for invisible ions are complexes of rare earth ions.

The chemical groups bound to the metal ion are called ligands. The ligands that in combination with a metallic ion absorb in the ultraviolet or blue called chromophore ligands.

The chemical groups bound to the metal ion are called ligands. The ligands that combination with a metallic ion absorb in the ultraviolet or blue are called chromophore ligands. One of the efficient ligands is dipicolnic acid pyridine 2,6 dicarbolic acid (DPA). Also other 5 member heterocyclic rings with substituted carboxylic groups can be used as ligands. Examples of other heterocyclic derivates are pyrazol 3,5 dicarboxylic acid, tiophen -2- carboxylic, pyridine 3,5 diacarboxylic acid.

The following backbone rings may be used: benzoic acid, biphenyl derivatives pyrimidine and pyrazine etc. The substutients that may be used to form the cordinate bonds beside carboxylic groups are sulfornic groups, hydrocylic (OH).

Another advantage of using the rare earth organic complex is that the luminescence at narrow band combined with the separation of wavelength (see FIG. 3) allows the detection of each one with minimum on interaction.

Figure 4:
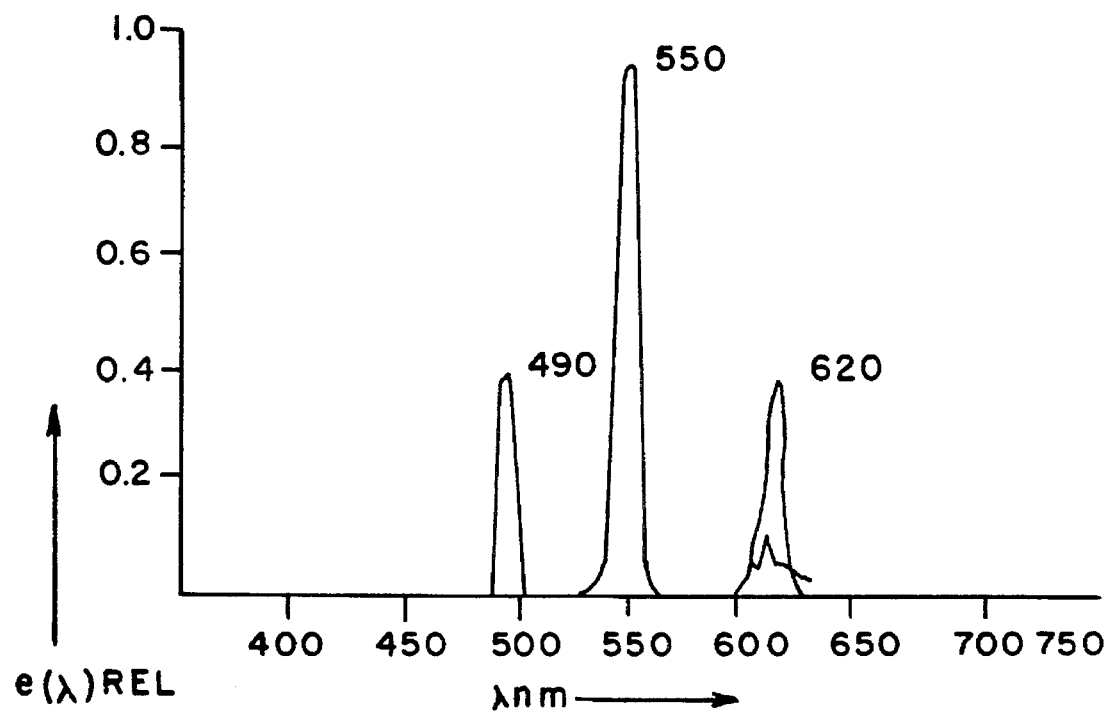
FIG. 4 is a graph of the fluorescence of three rare earth elements.

Another possibility is to use an organic component which is fluorescent with a band in combination with constituents with a narrow band provided that we can discriminate by the excitation wavelength as described in the description of FIG. 4.

The terbium complex of the invention, e.g., a tris (dipicolinato) -terbium (III) complex, has a suitable decay time, is transparent in the visible region of the spectrum, and is soluble in known carriers, such as varnishes. The europium product, i.e., a tris (dipicolinato)-europium (III) complex, produces a signal in another portion of the visible spectrum at the proper location for the processing of indicia produced by meter machines. The lanthanide DPA complexes have discrete excitation wavelength at 280 nm due to inner transition in the $5Do \rightarrow 7F^1$ and $5Do \rightarrow 7I_2$ as for example for Europium as described in the description of FIG. 5.

The ink that is used to print bar code 21 is a regular ink which absorbs in the visible range of the spectrum between (400–700 nm) and has a print contrast signal with a background of more than 0.4. An example of the above ink is any black ink that is currently being used in an ink jet printer, i.e. the desk jet printer manufactured by Hewlett Packard.

The general composition of the ink that is used to print bar code 31 is based on the compounds of dipicolinic acid (DPA) and rare-earth metals. The dipicolinic acid (DPA) is dissolved in an aqueous alkali metal hydroxide such as BOH where B may be sodium, lithium or potasiun. The DPA is completely dissolved and solution is then filtered. A rare-earth nitrate penthahydrate is dissolved in water and added with mixing to the DPA salt. The pH of the solution is adjusted to between 7.2 and 7.8. The solution is then diluted to bring the final concentration of rare-earth element to about 1%; this equals a concentration of about 4.6% for the metal chelate.

Examples of the inks that are used to print bar code 31 are as follows:

EXAMPLE 1

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. the solution is rhen mixed for 1.5 hours and half of the solution is filtered. An aqueous solution of $Eu(NO_3)_5(H_2O)_5$ was prepared by adding 7.5 gms of $Eu(NO_3)_5(H_2O)_5$ to 25 ml of water. To the filtered solution of DPA was added $Eu(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2' pyrrolidone was added as a humectant. The final solution was bottled and refigerated.

Figure 6:
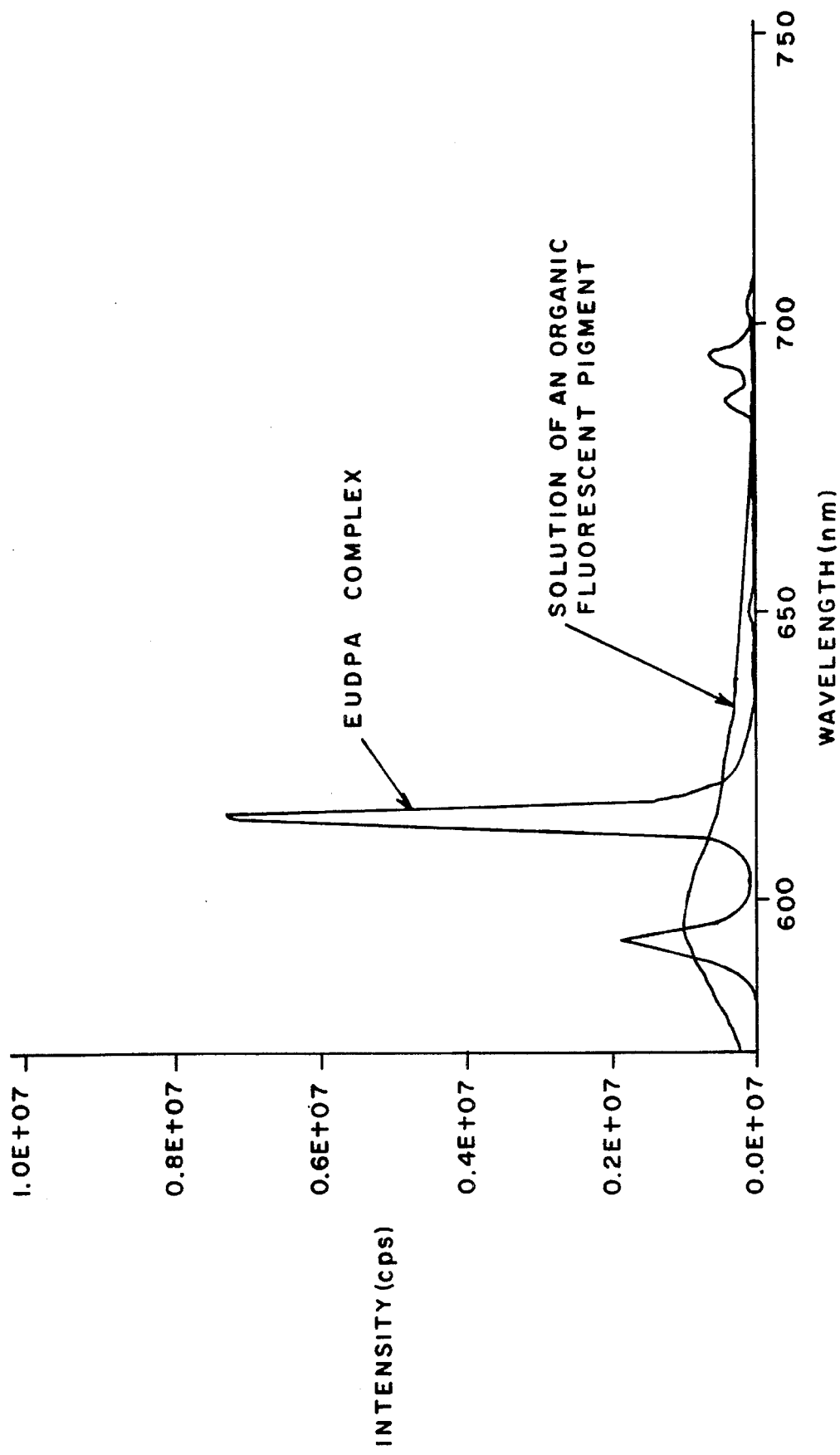
FIG. 6 is a graph of the fluorescence of an EuDPA complex and a solution of an organic fluorescent pigment.

A draw down of the above solution was made on a howard bond paper and the resultant fluorescence was measured with a phosphor meter. The resultant reading was 180 phosphor meter units. The fluorescent emission of the sample was measured with a LSS spectraphotometer and the results are shown in FIG. 6.

EXAMPLE 2

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. The solution is then mixed for 1.5 hours and half of the solution is filtered. An aqueous solution of $Tb(NO_3)_5(H_2O)_5$ was prepared by adding 7.5 gms of $Tb(NO_3)_5(H_2O)_5$ to 25 ml of water. To the filtered solution of DPA was added $Eu(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2'pyrrolidone was added as a humectant. The final solution was bottled and refigerated.

At the excitation of 280 nm an emission spectra was obtained with a fluorescence spectraphotometer Perkin Elmer LS-5 and the maximum wavelength of emission was 550 nm.

EXAMPLE 3

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. The solution is rhen mixed for 1.5 hours and half of the solution is filtered. An aqueous solution of $Dy(NO_3)_5(H_2O)_5$ was prepared by adding 7.5 gms of $Dy(NO_3)_5(H_2O)_5$ to 25 ml of water. To the filtered solution of DPA was added $Dy(NO_3)_5(H_2O)_5$ solution in 5 ml increments while stirring. A white percipitate formed. Twenty percent of $HNO_3$ was added until the final ph of the solution was 250 ml. The resultant solution was clear and colorless. To the colorless solution 7% of N-Methyl pynolidone was added as a humectant. The final solution was bottled and refigerated.

At the excitation of 280 nm an emission spectra was obtained with a fluorescence spectraphotometer Perkin Elmer LS-5 with the maximum wavelength of emission at 500 nm.

EXAMPLE 4

Dissolve 16.88 gms of sodium hydroxide in 250 ml deionized water. To the above solution add 35.26 gms of DPA and stirr overnight. Then add 1.5 gms to the previous solution to disolve the excess DPA. The ph of the above solution is 13.05. The solution is then mixed for 1.5 hours and half of the solution is filtered. An aqueous solution of $Nd(NO_3)_5(H_2)_5$ was prepared by adding 7.5 gms of $Nd(NO_3)_5(H_2O)_5$ to 25 ml of water. To the filtered solution of DPA was added $Nd(NO_3)_5 \cdot (H_2O)_5$ solution in 5 ml increments while stirring. A white percipitate formed. Twenty percent of $HNO_3$ was added until the final ph of the solution was 250 ml. The resultant solution was clear and colorless. To the colorless solution 10% of 2' pyrrolidone was added as a humectant. The final solution was bottled and refigerated.

At the excitation of 280 nm an emission spectra was obtained with a fluorescence spectraphotometer Perkin Elmer LS-5 with the maximum wavelength of emission at 1060 nm.

The terbium complex of the invention, e.g., a tris (dipicolinato)-terbium (III) complex, has a suitable decay time, is transparent in the visible region of the spectrum, and is soluble in known carriers, such as varnishes. The europium product, i.e., a tris (dipicolinato)-europium (III) complex, produces a signal in another portion of the visible spectrum at the proper location for the processing of indicia produced by meter machines. The lanthanide DPA complexes have discrete excitation wavelength at 280 nm due to inner transition in the 5Do→7F[1] and 5Do→7l[2] as for example for Europium as described in the description of FIG. 6.

The ink that is used to print bar code 21 is a regular ink which absorbs in the visible range of the spectrum between (400–700 nm) and has a print contrast signal with a background of more than 0.4. An example of the above ink is any black ink that is currently being used in an ink jet printer, i.e. the desk jet printer manufactured by Hewlett Packard.

The operation using the luminescent characteristics of the rare earth complexes are used as binary characteristics for their absence or prescience or they can be used at various intensities. The advantage is that the signal to noise ratio is extremely high for the invisible ink that allows a precision that can not be attained by identification of visible contrast.

The invisible inks can be used also by varying the intensity and therefore encoding more information, but in this case the parasite signals can not be eliminated such as in the case of binary signals.

The information contained in bar codes 21 and 31 may be read by utilizing light sources 40. Light source 40 comprises: light sources 41 and 42. Light sources 41 and 42 have different wavelengths. Source 41 is utilized to illuminated bar code 21 and source 42 is used to excite bar code 31. Source 41 is a lamp emitting light having a wavelength between 400 and 700 nm and source 42 is a ultraviolet source that emits light between 200–400 nm. Detector 43 comprise a detector 44 and a detector 45. Detector 44 is utilized to sense bar code 21 and detector 45 is utilized to sense bar code 31.

Detector 44 senses the reflected light from bar code 21 and detector 45 senses the emitted light from bar code 31. Detector 45 may be a photo diode or photo transistor.

FIG. 3 is a drawing of an alternate embodiment of this invention in which lower layer indicia is printed on an object with a normal ink and a upper layer indicia is printed above the lower layer-indicia with an invisible ink, similar to the invisible inks described in the description of FIG. 2. The indicia described is a postal indicia. However, any other indicia may be utilized. The document 60 will have a lower layer indicia that contains a dollar amount 62, the date the indicia was affixed to the mail piece 63, and the postal meter serial number 61. In addition, the document 60 will include a validation number 64.

A upper layer indicia 65 similar to the lower layer indicia is printed over the lower layer indicia with an invisible ink. Only the eagle portion of the lower layer comprises indicia 65.

The information contained in the lower layer indicia may be read by utilizing light source 51. Light source 51 is a lamp emitting a light having a wavelength between 400 and 700 nm. Detector 54 senses the reflected light from the lower layer indicia. The information contained in indicia 65 may be read by utilizing ultra violet light source 52. Ultra violet light source 52 emits light having a wavelength between 200–400 nm. Detector 45 senses the emitted light from indicia 65. Detector 65 may be a photo diode or photo transistor.

If light source 51 and 52 and detector 54 and 55 are periodically turned on and off approximately 16 times a second by switching mechanism 56, the eagle portion of the indicia will look like it is moving.

FIG. 4 is a graph of fluorescence of three rare earth elements. This graph shows the fluorescent emission of three rare earth complexes i.e. Dy (Dysprosium), Tb (Terbium), and Eu (Europium). The three emission lines are narrow, discrete and can be easily identified without mutual interference.

Figure 5:
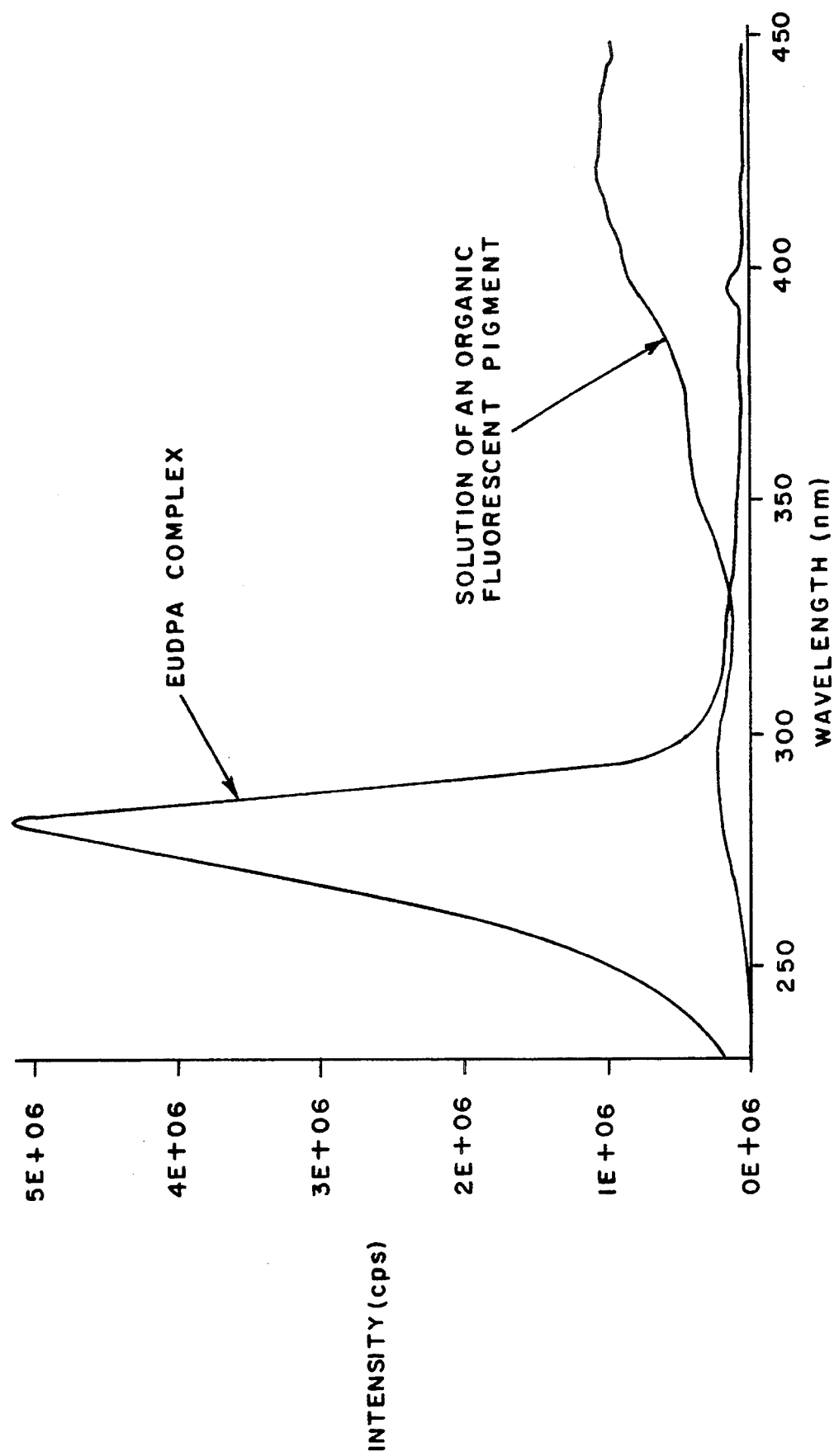
FIG. 5 is a graph of the excitation of the EuDPA complex and a solution of an organic fluorescent pigment.

FIG. 5 is a graph of the excitation of the EuDPA complex and a solution of an organic fluorescent pigment. The graph shows that the excitation spectra of the EuDPA complex is a narrow band with a peak in the short wavelength at 280 nm, while the organic fluorescent pigment has a very broad absorption band expanding from 250 nm up to 450 nm.

FIG. 6 is a DuDPA complex and a solution of an organic fluorescent pigment. This graph shows the emission spectra of the EuDPA complex with two narrow bands at 595 and 616 nm while the organic fluorescent pigment shows a broad fluorescent emission expanding from 550–650 nm.

The above specification describes a new and improved apparatus reading bar codes and indicia that are printed with normal inks and luminescent invisible inks. It is realized that the above description may indicate to those skilled in the art additional ways in which the principles of this invention may be used without departing from the spirit. It is, therefore, intended that this invention be limited only by the scope of the appended claims.

What is claimed is:

1. A system for sequentially reading indicia, said system comprises:

means for reading a first indicia that is printed on an object with a ink that is visible to the human eye by reflected light; and means for reading a second indicia that is placed on top of the first indicia, said second indicia is similar in appearance to said first indicia but differs from said first indicia and said second indicia is made of a luminescent ink that is invisible to the human eye; and means for switching from said first reading means to said second reading means so that said first and second indicia or a portion of said first and second indicia appear to a human observer viewing said first and second indicia to move.

2. The system claimed in claim 1, wherein said first reading means comprises:

a first light source that emits incident light that is reflected from the first indicia; and a first detector that reads the reflected light.

3. The system claimed in claim 2, wherein said light source emits light having a wavelength of 400–700 nm.

4. The system claimed in claim 1 wherein said second reading means comprises:

a second light source that emits ultraviolet light that impinges on the luminescent ink; and a second detector that detects the light that is emitted by the luminescent ink in order to read said second indicia.

5. The system claimed in claim 4, wherein said second detector is a photo diode or photo transistor.

6. The system claimed in claim 4, wherein said light source emits light having a wavelength of 200–400 nm.

7. The detector claimed in claim 4, wherein said detector detects light having wavelengths of 480–1800 nm.

\* \* \* \* \*